(12) United States Patent
Gallup

(10) Patent No.: US 6,214,238 B1
(45) Date of Patent: Apr. 10, 2001

(54) METHOD FOR REMOVING SELENOCYANATE IONS FROM WASTE WATER

(75) Inventor: Darrell Lynn Gallup, Santa Rosa, CA (US)

(73) Assignee: Tosco Corporation, Stamford, CT (US)

( * ) Notice: Subject to any disclaimer, the term of this patent is extended or adjusted under 35 U.S.C. 154(b) by 0 days.

(21) Appl. No.: 09/122,938

(22) Filed: Jul. 27, 1998

(51) Int. Cl.$^7$ .................................. C02F 1/52; C02F 9/00
(52) U.S. Cl. .......................... 210/717; 210/719; 210/726; 210/911
(58) Field of Search .................................. 210/717, 719, 210/726, 757, 902, 911, 912

(56) References Cited

U.S. PATENT DOCUMENTS

| | | | |
|---|---|---|---|
| 3,933,635 | * | 1/1976 | Marchant ............................. 210/719 |
| 4,405,464 | * | 9/1983 | Baldwin et al. ...................... 210/717 |
| 4,790,945 | * | 12/1988 | Baker ................................... 210/912 |
| 4,806,264 | * | 2/1989 | Murphy ................................ 210/717 |
| 4,935,146 | * | 6/1990 | O'Neill et al. ....................... 210/912 |
| 5,089,141 | * | 2/1992 | Murphy ................................ 210/719 |
| 5,510,040 | * | 4/1996 | Miller et al. ......................... 210/911 |
| 5,601,721 | * | 2/1997 | Lukasiewicz et al. ............... 210/684 |

* cited by examiner

Primary Examiner—Ivars Cintins

(57) ABSTRACT

A method for removing selenocyanate from aqueous waste water containing a reducing agent by adding a water soluble cupric salt, said waste water containing a reducing agent having a potential to reduce the cupric ion to the cuprous ion, and removing the resulting selenocyanate precipitate from said waste water.

11 Claims, No Drawings

METHOD FOR REMOVING SELENOCYANATE IONS FROM WASTE WATER

BACKGROUND OF THE INVENTION

The removal of selenium from waste water is oftentimes a difficult challenge. Particularly difficult and complicated is the removal of selenium from process water in the mining, coal gasification and petroleum refining industries. For example, sour crude oils and coals produced or mined from formations containing seleniferous marine shales often contain significant amounts of selenium. During the refining of such crude oil, the refinery process water is found to contain relatively large amounts of selenocyanate ions derived from sodium or ammonium selenocyanate which is formed during the refinery process. Coal gasification process waters may also contain selenium as selenocyanate ion. Where cyanide leaching is utilized in the mining industry, selenium can be complexed with cyanide as selenocyanate.

The present invention relates to a process for treating waste water (e.g. refinery process water) containing selenocyanate ions to remove and/or significantly reduce the amount of selenocyanate ions for example to less than about 0.1 mg/L.

The present invention accomplishes the foregoing by adding to waste water containing selenocyanate ions, a water soluble cupric salt, the waste water also containing at least a stoichiometric amount, based on the cupric salt, of a reducing agent for the cupric salt. The cupric salt can be a neutral or basic salt but the acid salt is preferred. The cupric ion of the cupric salt (which is water soluble) is reduced by the reducing agent to the cuprous ion which in turn reacts with the selenocyanate ion to produce cuprous selenocyanate in which the Se is immobilized in the cyanate complex. This complex is water insoluble and forms a precipitate which is easily removed from the waste water.

It was very surprising that the formation of the cuprous ion insitu would be effective in removing and/or reducing the amount of selenocyanate ion from waste water since the direct addition of a cupric salt is not effective in appreciably reducing the selenocyanate ion concentration in waste water. This is due, at least in part, to the fact that cupric selenocyanate is relatively water soluble.

For a number of years the problem of removing selenium from waste water has been a concern. It is therefore not surprising that a number of methods have been disclosed in the prior art for the removal of various forms of selenium. For example, U.S. Pat. No. 5,089,141 discloses the removal of "organoselenium" from water by adding a composition containing nickel and/or copper and magnesium and/or aluminum. The patent states that the addition of this composition forms elemental selenium which is a water insoluble precipitate and may be removed from the waste water.

U.S. Pat. No. 4,405,464 discloses a process for the removal of selenium ions from mine water prior to discharge of the aqueous stream into the ground water system. According to the patent, "it is known" that selenium can be removed from aqueous compositions if the selenium is present in the selenite state by, for example, the addition of an iron salt such as ferric or ferrous sulfate, chloride or hydroxide. The '464 patent discloses using metallic iron powder to remove selenite by reducing it. The reduced selenite then forms a precipitate and is removed from the aqueous composition.

U.S. Pat. No. 4,806,264 discloses a method of removing selenium ions from an aqueous solution by adding to the solution ferrous ions to reduce the selenium ions to elemental selenium.

U.S. Pat. No. 3,933,635 discloses removal of selenium from acidic waste water using zinc.

U.S. Pat. No. 5,510,040 is directed to the removal of selenium compounds from aqueous liquids by using polydithiocarbamate compounds.

U.S. Pat. No. 4,935,146 discloses, among other things, removing selenium from waste water with the compound having the formula shown in column 4, line 4 of the patent A cupric salt does not fall within the formula disclosed in this patent.

U.S. Pat. No. 4,790,945 discloses a removal of hydrogen selenide from a liquid, a heavy metal non-selenide salt which is stated to precipitate the hydrogen selenide as a heavy metal selenide salt. The patent goes on to state that, conveniently, the heavy metal is copper, because copper selenide has very low solubility and that cupric chloride is preferred.

SUMMARY OF THE INVENTION

The present invention is predicated upon the surprising discovery that selenocyanate ions can be removed from aqueous waste water by adding a water soluble cupric salt to said waste water in the presence of at least a stoichiometric amount (based on the cupric ion) of a reducing agent wherein the cupric ion is reduced to the cuprous ion thus forming this ion insitu in the aqueous waste water. As noted previously, the direct addition of the cupric ion to such waste water is not effective in removing the selenocyanate ion nor is the addition of a cupric salt without a reducing agent. The reaction of the cuprous ion with the selenocyanate ion forms primarily a cuprous selenocyanate complex with the selenium being immobilized within the cyanate complex. This complex, which is water insoluble and forms a precipitate, renders the easy removal of selenium from the waste water with no danger that the selenium will remain in the waste water.

Inorganic water soluble cupric salts useful in the present invention (in the presence of a reducing agent) are usually acidic and include cupric halides, particularly cupric chloride, cupric nitrate and cupric sulfate. Other water soluble cupric salts useful in the present invention are cupric acetate, cupric carbonate hydroxide, cupric fluoborate and cupric oxychloride.

These water soluble cupric salts are added to waste water, particularly refinery process water, coal gasification process water and mining process water which contain selenocyanate ions. The water soluble cupric salts will, in general, be added in a slight stoichiometric excess (based on the cuprous ion) relative to the selenocyanate ions present in the waste water and, after the cupric ion is reduced to the cuprous ion, there is a reaction between the cuprous ion and the selenocyanate ion to form cuprous selenocyanate which is water insoluble and precipitates out of the waste water and removed. As noted previously, the Se is immobilized in the cyanate complex.

Since normally a slight excess of the copper salt is added in order to effectively remove all or substantially all of the selenocyanate ion in the waste water, this copper should be removed from the waste water prior to disposing of the waste water. Generally speaking, the removal of the copper can be accomplished by adding to the selenocyanate free waste water, a water soluble inorganic compound having an ion which reacts with the copper to form an insoluble copper salt. Examples of such compounds are caustic soda and water soluble sulfide containing compounds, such as ammonium sulfide, alkali metal sulfides (e.g. sodium sulfide and potassium sulfide) and alkaline earth metal sulfides (e.g. magnesium sulfide, calcium sulfide and barium sulfide).

Reducing agents which are usefull in the present invention include those reducing agents which are water soluble and have a potential to reduce cupric ion, generally greater than about 0.95 millivolts. Generally speaking, the reducing agents useful in the present invention should be able to function in a mildly acidic environment as well as being non-toxic since it would inadvisable to add another compound that causes environmental problems when discharged. Oftentimes, the reducing agent must work below pH-6 because upon addition of acidic cupric salts, the pH of the waste water will oftentimes drop to a pH of between about 5 to 6. There are literally hundreds of reducing agents which are useful in the present invention and include metal salts such as iron salts, for example, ferrous chloride, ferrous sulfate, etc., and tin (stannous) salts. Other reducing agents useful in the present invention contain sulfur such as sulfurous acid, sulfite salts, bi-sulfite salts, thioglycolic acid or salts thereof, thiosulfuric acid or thiosulfate salts, dithionates (e.g. sodium dithionate), trithionates, sulfur dioxide, hyposulfites, ammonium thiocarbonate and the like. Organic reducing agents include hydroquinone, hydrogen gas, formic acid, oxalic acid, methanol, formaldehyde, glyoxal, cyanogen gas, reducing sugars and ascorbic acid. Metallic reducing agents include aluminum, manganese, zinc, iron and tin. Other miscellaneous reducing agents useful in the present invention are sodium borohydride, phosphorous, hypophosphorous acid, nitrous acid or nitrite salts, hydrazine and urea.

In some instances, some waste water contains a sufficient amount of a reducing agent so that no additional reducing agent is needed to be added to the waste water. The only important thing is is that the reducing agent must be present in order to have the copper react with the selenocyanate ion to form a water insoluble precipitate which, is easily removed, by means known in the art, including flocculation, clarification, centrifuging, and filtering.

DETAILED DESCRIPTION OF THE INVENTION

A waste water (pH 9.6) containing 7 mg/L selenocyanate, 65 mg/L chloride, 15 mg/L thiocyanate, 165 mg/L thiosulfate (reducing agent), 5 mg/L sulfite (reducing agent) and 15 mg/L sulfate was treated with 2 g/L of cupric chloride dihydrate. The selenocyanate concentration in the water was reduced to less than 0.1 mg/L upon rapid precipitation of a brown solid which was removed by filtration. The precipitate contained cuprous selenocyanate.

EXAMPLES 2–5

In these examples, refinery stripper water was used which contains varying amounts of selenocyanate ion, as indicated in the following table. To such waste water was added varying amounts of cupric sulfate, the waste water containing, as reducing agents 165 mg/L of thiosulfate and 5 mg/L of sulfite.

| Sample | Treatment | Result |
|---|---|---|
| 1 | none | Se = 250 ppb |
| 1 | 10 ppm Cu | Se = 5 ppb |
| 2 | none | Se = 2,640 ppb |
| 2 | 240 ppm Cu | Se = 10 ppb |

-continued

| Sample | Treatment | Result |
|---|---|---|
| 2 | 260 ppm Cu | Se = 46 ppb |
| 3 | none | Se = 2,790 ppb |
| 3 | 160 ppm Cu | Se = 35 ppb |
| 4 | none | Se = 2,630 ppb |
| 4 | 100 ppm Cu | Se = 6 ppb |

The precipitate is settled using Magnifloc 492 C cationic flocculent and then removed and passed through a filter process. The water is removed from the precipitate and may be used as a copper smelter feedstock or recycled by a metal recycler.

The selenocyanate-free waste water is then treated with sodium sulfide which reacts with the copper remaining in the waste water to form water insoluble CuS, which is precipitated out of the waste water. It should be noted that I have discovered that CuSeCN needs to be completely precipitated and removed from the waste water before the excess $Cu^{2-}$ is precipitated with sulfide. If sulfide is added to water in the presence of CuSeCN solids, S replaces Se forming CuSCN. The Se released under this condition is sufficient to exceed 0.1 mg/L. This novel phenomena and not known to those skilled in the art.

I claim:

1. A method for removing selenocyanate ions from waste water comprising adding to said waste water a water soluble cupric salt, said waste water containing a reducing agent having a potential greater than about 0.95 millivolts to reduce the cupric ion to the cuprous ion, the amount of reducing agent being sufficient to reduce the cupric ion of said cupric salt to the cuprous ion, the amount of cupric salt added to said waste water being a stoichiometric excess relative to the amount of selenocyanate in said waste water; and removing the resulting selenocyanate precipitate from said waste water.

2. A method according to claim 1 wherein said cupric salt is selected from the group consisting of cupric halide, cupric nitrate and cupric sulfate.

3. A method according to claim 2 wherein said cupric salt is cupric chloride.

4. A method according to claim 2 wherein said cupric salt is cupric sulfate.

5. A method according to claim 1 wherein said reducing agent is added to said waste water prior to the addition of the cupric salt.

6. A method according to claim 1 wherein said reducing agent is a member selected from the group consisting of thiosulfate and sulfite.

7. A method according to claim 1 wherein water soluble cupric salt is an acid cupric salt.

8. A method for removing selenocyanate ions from waste water comprising adding to said waste water a water soluble cupric salt, said waste water containing a reducing agent having a potential to reduce the cupric ion to the cuprous ion, the amount of reducing agent being sufficient to reduce the cupric ion of said cupric salt to the cuprous ion, the amount of cupric salt added to said waste water being a stoichiometric excess relative to the amount of selenocyanate in said waste water; removing the resulting selenocyanate precipitate from said waste water; and adding to said waste water after removal of the selenocyanate precipitate, a stoichiometric excess, based on the amount of unreacted cuprous and/or cupric ions, of a water soluble compound having an ion which reacts with the cupric/cuprous ions in said waste water to form a water insoluble salt from said waste water.

9. A method according to claim 8 wherein said water soluble compound is a sulfide salt.

10. A method according to claim 9 wherein said sulfide salt is a member selected from the group consisting of ammonium sulfide, alkali metal sulfide and alkaline earth metal sulfide.

11. A method according to claim 9 wherein said sulfide salt is a member selected from the group consisting of ammonium sulfide, sodium sulfide, potassium sulfide, magnesium sulfide, calcium sulfide and barium sulfide.

* * * * *